(12) United States Patent
Rolain et al.

(10) Patent No.: US 8,151,419 B2
(45) Date of Patent: Apr. 10, 2012

(54) IDENTIFICATION TAG RETAINER

(75) Inventors: Ronda Rolain, Lakewood, CO (US); Kenneth W House, Fort Collins, CO (US); Doug P Collins, Loveland, CO (US)

(73) Assignee: Ronda Rolain, Lakewood, CO (US)

( * ) Notice: Subject to any disclaimer, the term of this patent is extended or adjusted under 35 U.S.C. 154(b) by 247 days.

(21) Appl. No.: 12/491,859

(22) Filed: Jun. 25, 2009

(65) Prior Publication Data
US 2009/0320770 A1 Dec. 31, 2009

Related U.S. Application Data

(60) Provisional application No. 61/075,411, filed on Jun. 25, 2008.

(51) Int. Cl.
*F16B 15/00* (2006.01)
(52) U.S. Cl. ........ 24/601.5; 24/370; 24/598.5; 24/599.2
(58) Field of Classification Search .................... 24/370, 24/598.5, 599.2, 601.5; 59/87, 88; 294/88.18
See application file for complete search history.

(56) References Cited

U.S. PATENT DOCUMENTS

| | | | |
|---|---|---|---|
| 312,105 A | 2/1885 | Faivre | |
| 324,637 A * | 8/1885 | Barnes | 59/88 |
| 704,973 A | 7/1902 | Katz | |
| 894,223 A * | 7/1908 | Nelsen | 59/87 |
| 1,151,246 A * | 8/1915 | Criswell | 59/88 |
| 1,165,882 A | 12/1915 | Klllion | |
| 1,232,626 A | 7/1917 | Trieschmann | |
| 1,249,241 A * | 12/1917 | Sunderland | 24/598.5 |
| 1,353,605 A | 9/1920 | Napolillo | |
| 1,428,678 A | 9/1922 | Buchsbaum | |
| 1,539,744 A | 5/1925 | Kelly | |
| 1,550,406 A | 8/1925 | Wilson | |
| 1,749,096 A * | 3/1930 | Baxter | 24/599.2 |
| 1,803,196 A | 4/1931 | Mader | |
| 1,841,423 A | 1/1932 | Wells | |
| 1,974,856 A | 9/1934 | White et al. | |
| 1,979,069 A * | 10/1934 | Hancock | 59/88 |
| 2,095,481 A | 10/1937 | Skopec | |
| 2,097,070 A | 10/1937 | Lago | |
| 2,548,104 A | 4/1951 | Frison | |
| 2,648,150 A | 8/1953 | Sullivan | |
| 2,680,315 A | 6/1954 | McHugh et al. | |
| 2,821,034 A | 1/1958 | Baker | |

(Continued)

OTHER PUBLICATIONS

MADE-IN-CHINA.COM. Carabiner (YF-P028). Downloaded at http://www.made-in-china.com/ on Sep. 25, 2009.

*Primary Examiner* — Robert J Sandy
(74) *Attorney, Agent, or Firm* — Holland & Hart LLP

(57) ABSTRACT

A retainer comprising first and second frames each including at least one arm. The frames are movably coupled and operative to be selectively oriented between an open state and a closed state. The arms are cooperative to form a closed loop when the frames are in the closed state. The frames may include pairs of arms that cooperate to form a pair of closed loops. The arms extend from respective first and second body portions which include cooperative alignment features, such as mating tongue and groove features. The arms may also include alignment features, such as pins sized and configured to mate with receptacles. The retainer also includes a fastener for selectively permitting movement between the open and closed states.

15 Claims, 10 Drawing Sheets

U.S. PATENT DOCUMENTS

| | | |
|---|---|---|
| 2,880,701 A | 4/1959 | Foster |
| 2,937,834 A | 5/1960 | Orenick et al. |
| 3,346,980 A | 10/1967 | Wallace |
| 3,373,924 A | 3/1968 | Linda et al. |
| 3,481,528 A | 12/1969 | Leiter et al. |
| 3,729,780 A | 5/1973 | White |
| D243,411 S | 2/1977 | Johnson |
| 4,259,798 A | 4/1981 | McConnell |
| 4,309,797 A | 1/1982 | Schrougham et al. |
| 4,319,776 A | 3/1982 | Moberg |
| 4,352,253 A | 10/1982 | Oswalt |
| 4,512,093 A | 4/1985 | Kolton et al. |
| 4,739,566 A | 4/1988 | Smith |
| 5,474,033 A | 12/1995 | Mitchell, Jr. |
| 5,535,491 A | 7/1996 | Allport |
| 6,243,922 B1 | 6/2001 | Simon |
| 6,314,625 B1 | 11/2001 | Ikeda |
| D465,993 S | 11/2002 | Kelleghan |
| 6,598,326 B2 | 7/2003 | Wikan |
| 6,735,894 B2 | 5/2004 | Crusenberry et al. |
| 6,943,314 B2 | 9/2005 | Kosted |
| 7,225,761 B2 | 6/2007 | Reilly |
| 7,305,782 B2 | 12/2007 | Olsen |
| 2003/0033737 A1 | 2/2003 | Bradshaw et al. |
| 2005/0268864 A1 | 12/2005 | Gallagher et al. |

\* cited by examiner

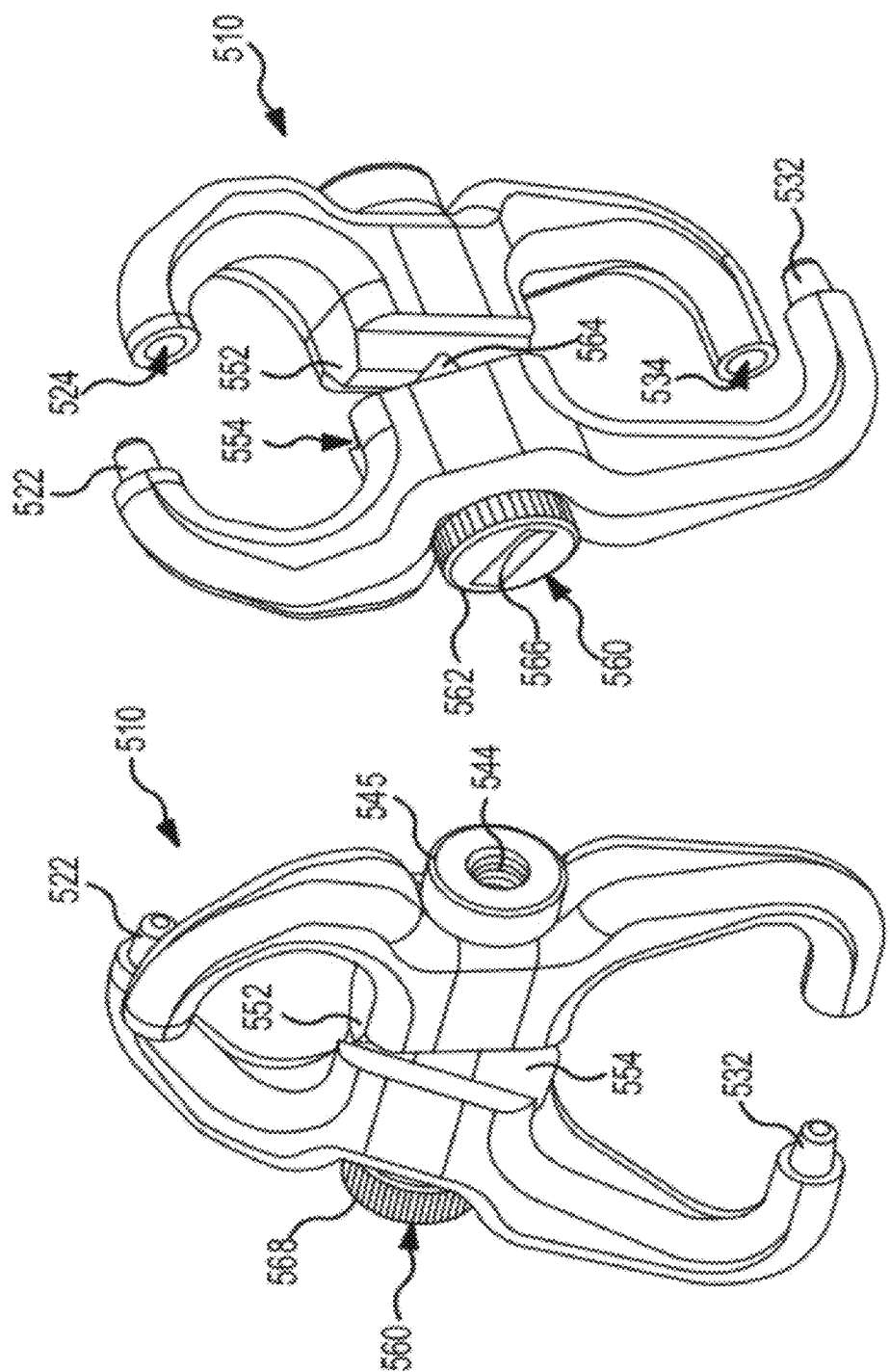

IDENTIFICATION TAG RETAINER

BACKGROUND

It is estimated that pets currently outnumber people in the United States by at least 60 million, with pets numbering around 360 million. Humans have kept pets for thousands of years not as property but as friends and family members. In fact, pet owners often treat their pets as children, buying them toys, special treats, beds, clothing, and collars. Many pet owners purchase various clothing and collars so they can dress their pets in different outfits on different days, or for different occasions. Of particular interest in this case, pet collars are useful not only to dress up a pet but for attaching identification tags to the pet. These identification tags often include those required by regulation such as registration, licensing, and rabies vaccination tags. In addition, a pet owner will usually include a tag with information such as the pet's name, owner's address, and phone number. This information is intended to aid in recovery of the pet in the event the pet should become lost. These tags are usually made of metal or durable plastic and have a hole through which they may be attached to the pet's collar.

Most collars include a metal ring such as a D-ring for attaching identification tags. The tags are commonly attached to the D-ring with an S-hook that is formed of a malleable material such that one end of the hook may be inserted through the tag's hole and bent over to close the hook. Similarly, the other end of the hook is inserted through the D-ring and bent to close the hook, thereby permanently attaching the tag to the collar. Other devices for attaching tags to the collar are known, such as split rings, ball chains, and the like. These existing attachment devices are somewhat permanent or at least very difficult to remove making it inconvenient to add tags or change collars. Additionally, these devices do little to control and confine the tags relative to the collar. As such tags may become tangled, create excessive noise, and create a source of discomfort to the pet. Accordingly, there is a need for an identification tag retainer for conveniently attaching identification tags to a pet's collar that is easily detached while further confining and controlling the tags.

SUMMARY

Provided herein is a retainer, comprising first and second frames movably coupled and operative to be selectively oriented between an open state and a closed state. The first and second frames include at least one arm. The arms are cooperative to form a closed loop when the first and second frames are in the closed state. The frames may include pairs of arms that cooperate to form a pair of closed loops when in the closed state.

The arms extend from respective first and second body portions. The body portions include cooperative alignment features, such as mating tongue and groove features. Also, the first arms may include pins sized and configured to mate with a receptacles formed in the second arms. The arms may extend arcuately and taper as they extend from their respective body portions. Furthermore, the arms may all lie in a common plane.

The retainer also includes a fastener for selectively permitting movement between the open and closed states. The frames may be rotatable about the fastener as well as axially movable along the fastener. The fastener may extend through the body portions and threadably engage one of the first and second frames.

A retainer that is comprised of a pair of substantially identical frames is also contemplated. This retainer includes a pair of reversible frames that each include a body portion, a first arm extending from the body portion that includes an alignment pin, and a second arm extending from the body portion that includes a receptacle. The pins mate with the receptacles and the arms form a pair of closed loops when the frames are oriented in the closed state. Each body portion may also include tongue and groove features which mate with each other when the frames are in the closed state.

BRIEF DESCRIPTION OF THE DRAWINGS

FIG. 16 is a perspective view as viewed from the right, illustrating the retainer according to the fourth exemplary embodiment with the two halves rotated;

FIG. 17 is a perspective view as viewed from the left, illustrating the retainer according to the fourth exemplary embodiment with the two halves rotated.

DETAILED DESCRIPTION

Figure 1:
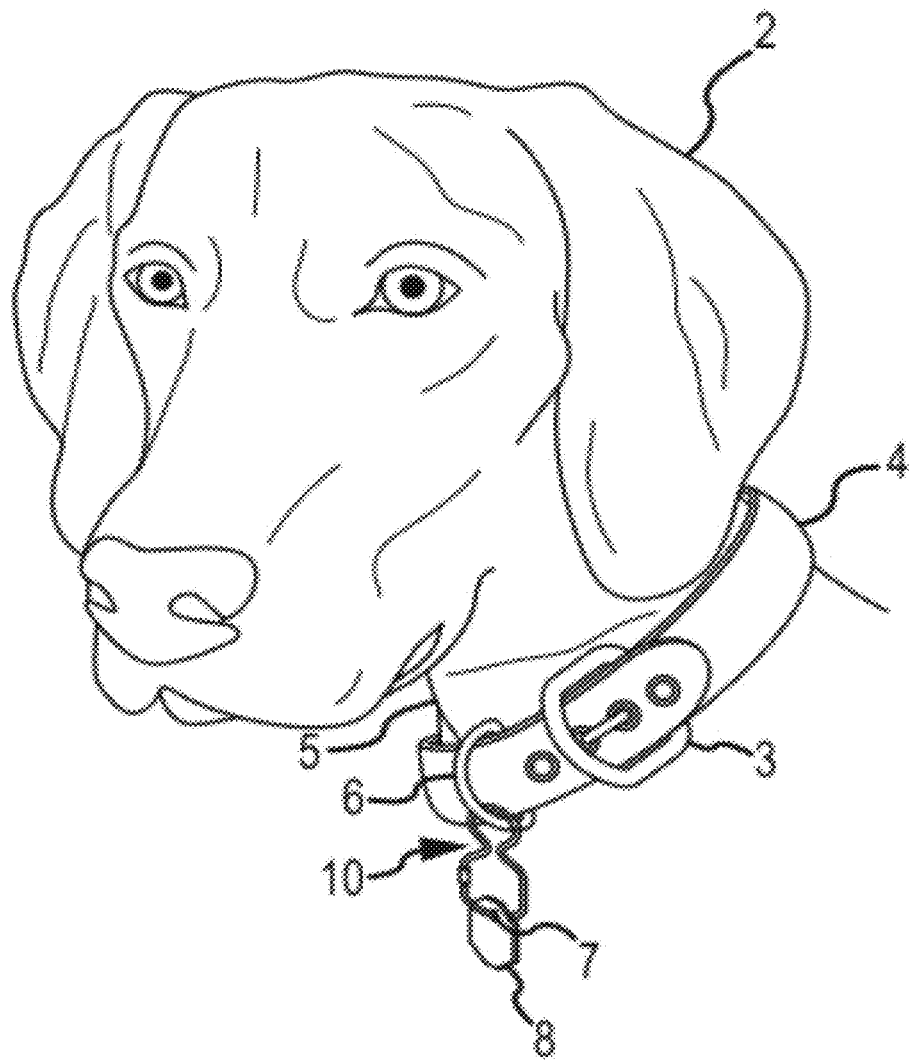
FIG. 1 is a perspective view showing the identification tag retainer according to a first exemplary embodiment being employed to attach a tag to a pet's collar.

Provided herein is an identification tag retainer for releasably attaching identification tags to a pet's collar while further confining and controlling the tags. FIG. 1 illustrates identification tag retainer 10 according to a first exemplary embodiment being employed to releasably attach an identification tag 8 to dog collar 4 that is worn about the neck 5 of pet 2, which in this case is a dog. Dog collar 4 is of a typical construction that includes a buckle 3 and a connector such as D-ring 6. It should be appreciated that while the exemplary embodiments are described with respect to a dog and a particular construction of collar, the identification tag retainer described herein may be used on different animals and with different collar constructions.

Retainer 10 includes loop 12 that has an upper loop portion 20, a lower loop portion 30, and a narrowed neck region 60 therebetween. Loop 12 is preferably formed of an elongate material having a cross section of diameter "x" sized to fit through hole 7 of identification tag 8. A typical pet tag has a hole approximately ⅛" in diameter. Accordingly, as an example, loop 12 may be formed of aluminum wire with a diameter of approximately 3 mm. It should be understood, however, that loop 12 may be formed of any suitable material such as plastic steel or the like. Furthermore, the cross-section and diameter of the elongate material may vary as well.

Figure 2:
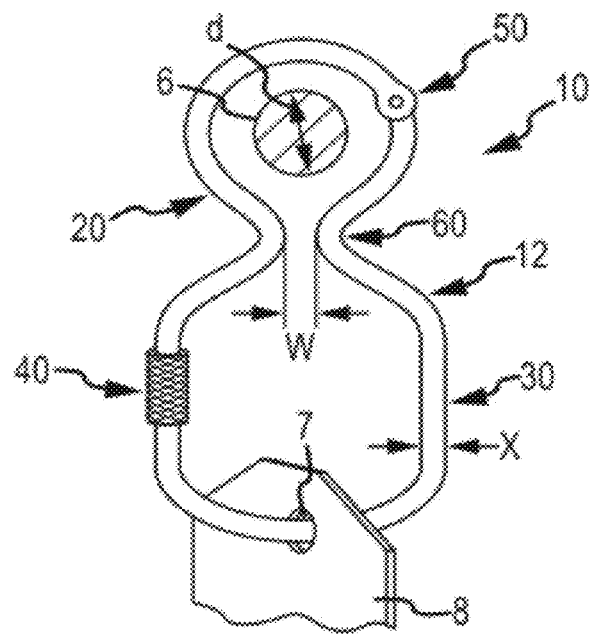
FIG. 2 is a perspective view in elevation of the retainer according to the first exemplary embodiment shown in a closed state.

In FIG. 2, retainer 10 is shown in a closed state such that D-ring 6 is captured in upper loop portion 20 and tag 8 is retained on lower loop portion 30. It can be appreciated from the figure that narrowed neck region 60 creates an opening between upper loop 20 and lower loop 30 that has a width "w" that is narrower than the diameter "d" of D-ring 6, shown here in cross-section. Thus, when retainer 10 is attached to D-ring 6, the D-ring may be captured in upper loop portion 20. This acts to confine and control the tags relative to collar 4.

Figure 3:
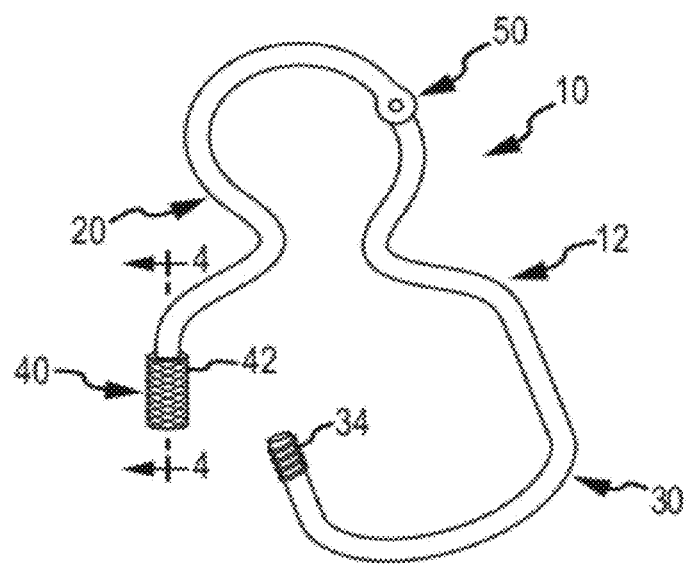
FIG. 3 is a plan view in elevation of the retainer according to the first exemplary embodiment shown in an opened state.
Figure 4:
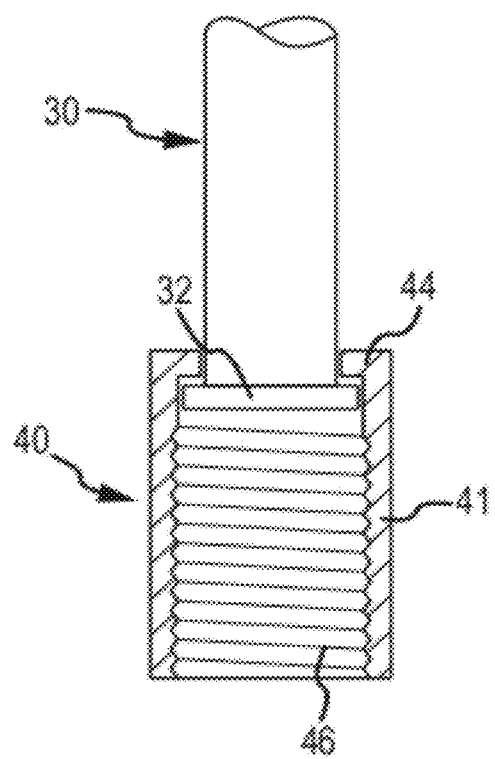
FIG. 4 is a partial cross-section, not to scale, taken about line 4-4 in FIG. 3, and illustrating an exemplary construction of the locking collet.

FIG. 3 shows retainer 10 in an open state which allows retainer 10 to be removably attached to a D-ring 6 and simultaneously allows for the addition and removal of identification tags. Upper loop portion 20 includes a pivot or hinge 50 and lower loop portion 30 includes locking collet 40. With further reference to FIG. 4, locking collet 40 includes a tubular sleeve 41 having internal threads 46 formed therein. Threads 46 mateably engage external threads 34 of lower loop portion 30. Locking collet 40 may be retained on lower loop portion 30 by shoulder 44, which is captured by enlarged diameter 32. Preferably, locking collar 40 includes knurling 42 to provide grip for threading locking collet 40 to and from external threads 34. One skilled in the art will recognize that while a locking collet is described here as an example, other locks or retainers may be employed.

Figure 5:
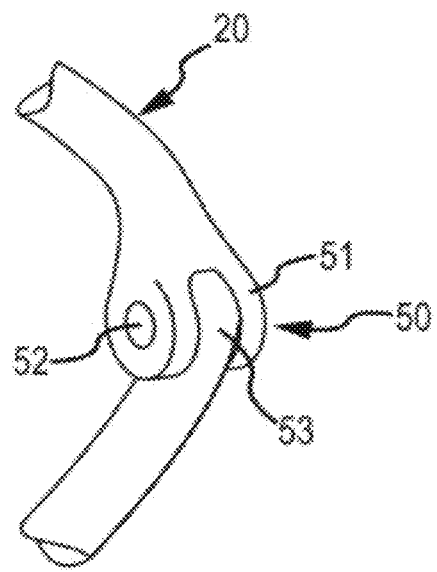
FIG. 5 is an enlarged partial perspective view illustrating an exemplary construction of the retainer hinge.

As should be readily understood from FIGS. 2 and 3, retainer 10 may be opened by unscrewing locking collet 40 and thereafter opening loop 12, which is facilitated by hinge 50. As can be appreciated in FIG. 3 when retainer 10 is in the open state narrowed neck region 60 is enlarged such that D-ring 6 may pass through the opening. Hinge 50 is formed in upper loop portion 20 and is perhaps best shown in FIG. 5. Hinge 50 includes cooperative knuckles 51 and 53 with pivot pin 52 extending therebetween. It should be understood that while a hinge is shown as an example, other equivalent structures for providing a pivot or flexure point may be used. For instance, where loop 12 is formed of plastic, hinge 50 may be a thin section relative to the rest of upper loop portion 20, which would provide a flexure point.

Figure 6:
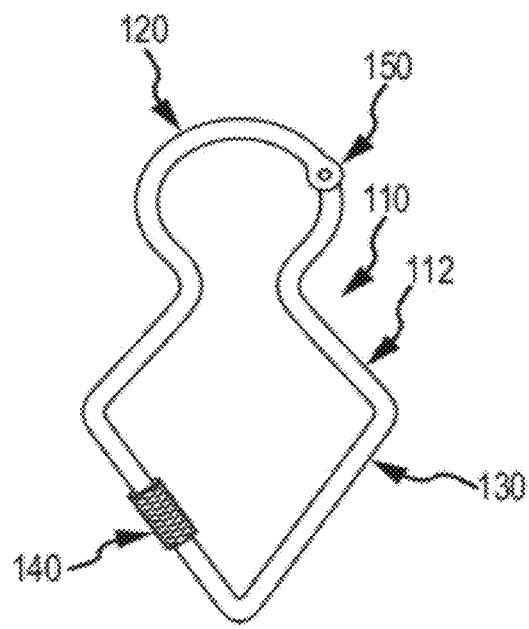
FIG. 6 is a plan view in elevation illustrating an alternate construction of the first exemplary embodiment.
Figure 7:
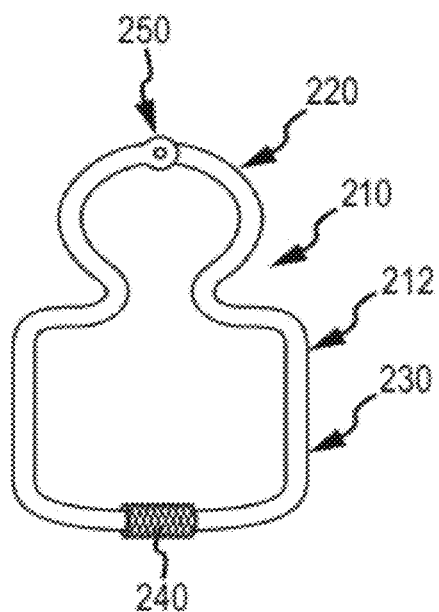
FIG. 7 is a plan view in elevation illustrating another alternate construction of the first exemplary embodiment.

FIGS. 6 and 7 illustrate exemplary alternative constructions of the first embodiment. FIG. 6 shows retainer 110 that includes loop 112 having an upper loop portion 120 and lower loop portion 130. In this construction lower loop portion 130 is in the shape of a diamond with locking collet 140 disposed along one of the facets of the diamond. FIG. 7 illustrates an alternative construction of the retainer 210 with upper and lower loop portions 220 and 230 respectively. In this construction lower loop portion 230 is in the shape of a square or rectangle. It should be understood from these representative constructions that upper and lower loop portions may be of various shapes. Furthermore, it should be understood, as is shown in FIG. 7, hinge 250 may be disposed anywhere along upper loop portion 220. Similarly locking collet 240 may be disposed anywhere along lower loop portion 230.

Figure 8:
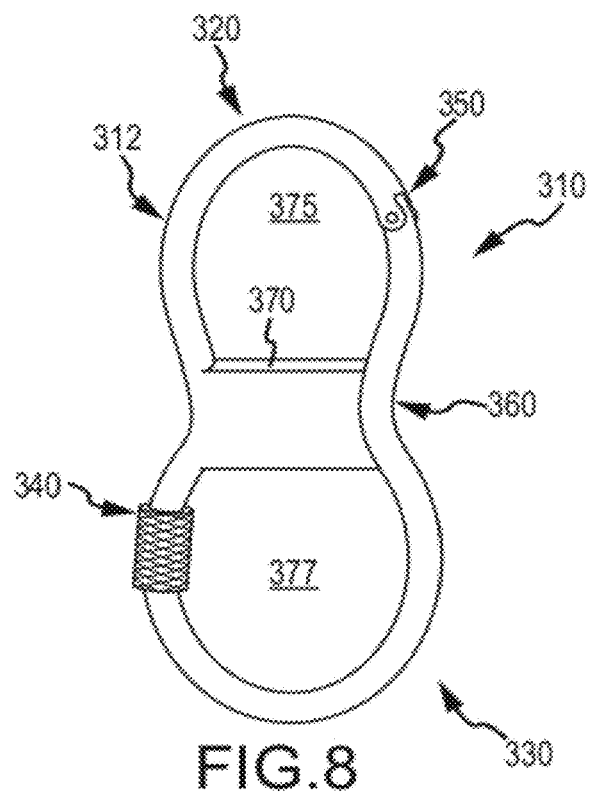
FIG. 8 is a perspective view illustrating the identification tag retainer according to a second exemplary embodiment.
Figure 9:
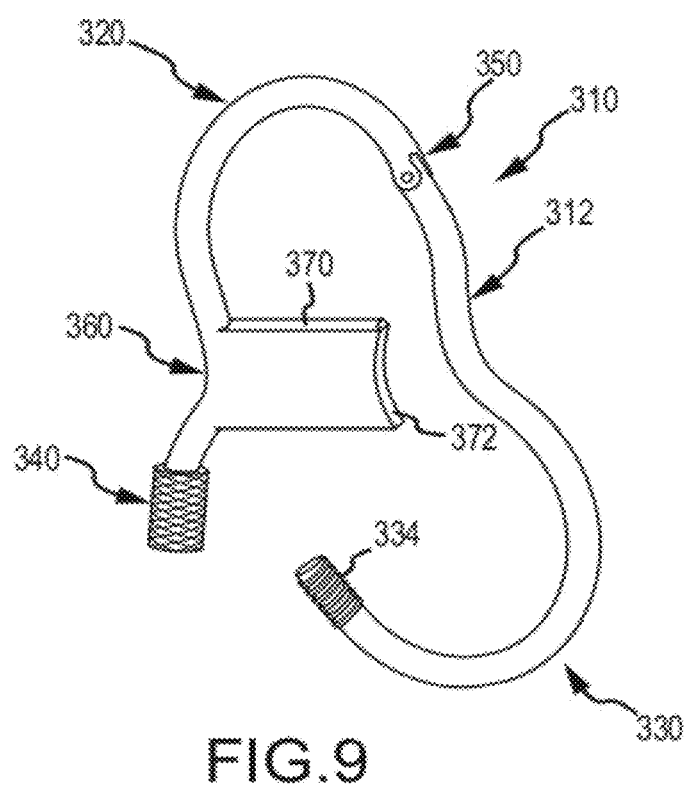
FIG. 9 is a perspective view illustrating the retainer according to the second exemplary embodiment shown in an opened state.

FIGS. 8 and 9 illustrate the identification tag retainer according to a second exemplary embodiment. Identification tag retainer 310 includes a loop 312, which has an upper loop portion 320, a lower loop portion 330, and narrowed neck region 360. In addition, retainer 310 includes cross-member 370 extending across the narrowed neck region. When retainer 310 is in the closed state, as shown in FIG. 8, cross-member 370 partitions loop 312 into upper and lower loop regions 375 and 377. When in the open state, as shown in FIG. 9, retainer 310 may be removed from the D-ring and/or tags may be added and removed. Retainer 310 is attached and removed from the D-Ring in a similar manner to that described with respect to the first embodiment, wherein locking collet 340 is unthreaded or disengaged from threads 334. It should also be noted as is shown in FIG. 9, that preferably cross-member 370 includes contoured surface 372 which congruently mates with narrowed neck region 360.

Figure 10:
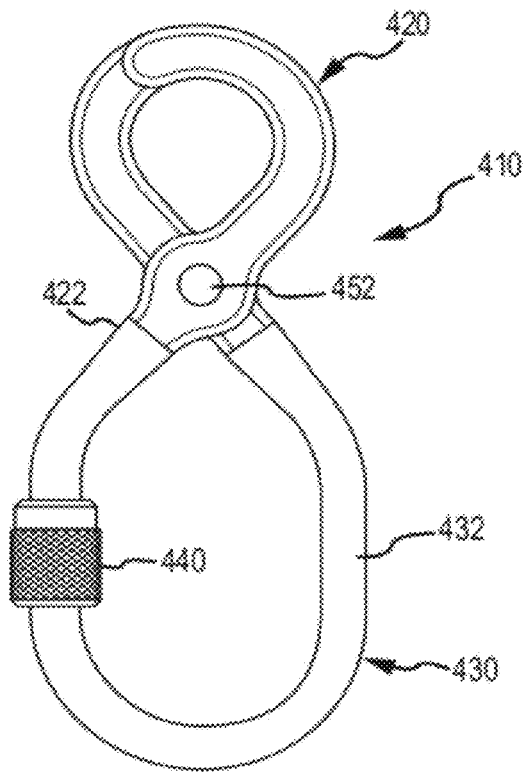
FIG. 10 is a plan view in elevation of the retainer according to a third exemplary embodiment shown in a closed state.
Figure 11:
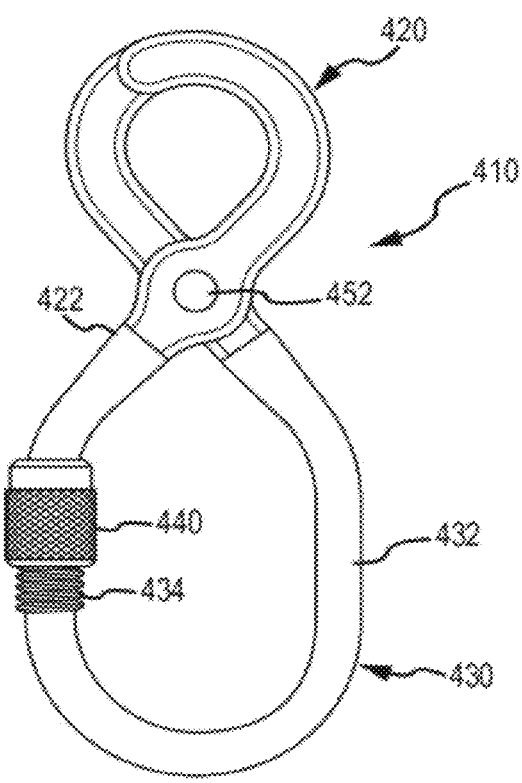
FIG. 11 is a plan view in elevation of the retainer according to the third exemplary embodiment shown with the locking collet released.

FIG. 10 illustrates a third exemplary embodiment of a retainer 410, which when in the closed state, includes a first loop portion 420 and a second loop portion 430. In this embodiment the retainer is comprised of first and second mating pieces 422 and 432. Mating pieces 422 and 432 cross over or intersect one another and are pivotally mounted to each other with a suitable fastener 452, such as a pin or rivet. As can be seen in FIG. 11, retainer 410 includes a locking collet 440 similar to that as described above with respect to the first embodiment. Collet 440 is retained on mating piece 422 and mateably engages with threads 434 of second piece 432 to secure retainer 410 in a closed state.

Figure 12:
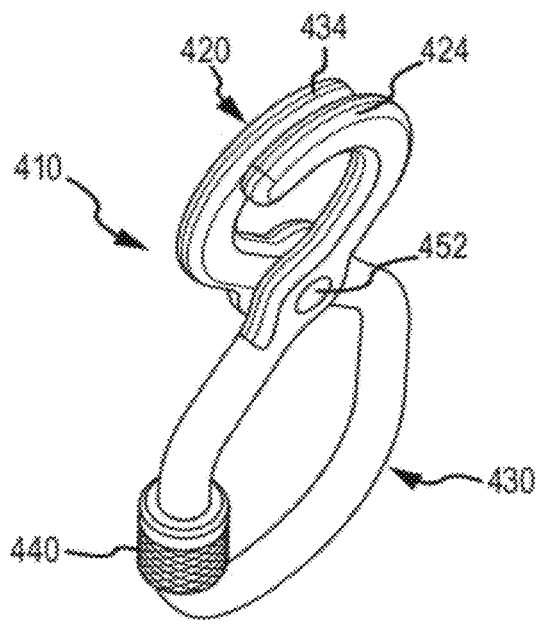
FIG. 12 is a perspective view illustrating the identification tag retainer according to the third exemplary embodiment.
Figure 13:
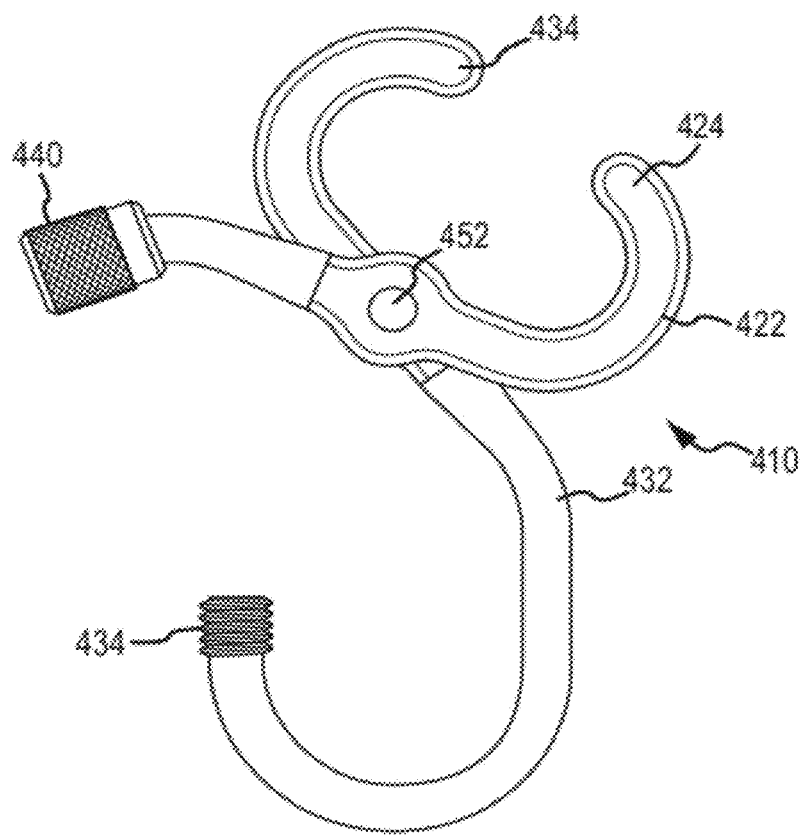
FIG. 13 is a plan view in elevation of the retainer according to the third exemplary embodiment shown in an opened state.
Figure 15:
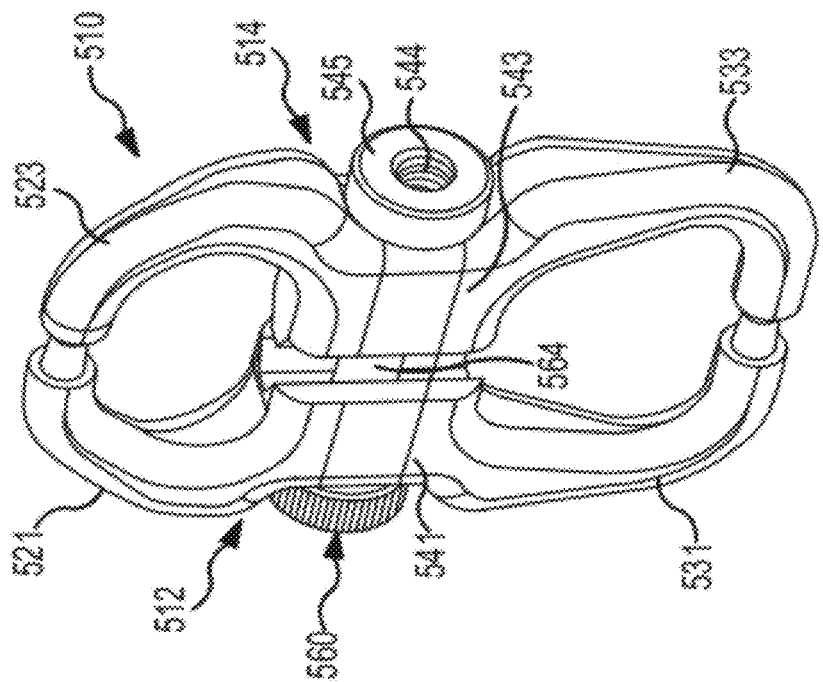
FIG. 15 is a perspective view illustrating the retainer according to the fourth exemplary embodiment shown in an opened state.

As can perhaps best be appreciated in FIG. 12, mating pieces 422 and 432 each include a corresponding hook or jaw shaped portion 424 and 434. When in the closed position, hooked portions 424 and 434 are congruently aligned with each other and overlap one another to form loop portion 420. When collet 440 is disengaged from threads 434 mating pieces 422 and 432 may pivot about fastener 452, thereby simultaneously opening loop portions 420 and 430 for access, such as shown in FIG. 13. Again referring to FIG. 12, it can be appreciated that, in this case, hooked portions 424 and 434 have an oblate cross-section which facilitates a close fitted arrangement between the hook portions when retainer 410 is in the closed state. It can also be seen in FIG. 12 that the lower loop portion 430 is comprised of a more circular cross-section.

An ordinarily skilled artisan will recognize that this embodiment may be formed by stamping and bending segments of wire to form the structures shown in the figures. However, retainer 410 may be formed from any suitable manufacturing process or method as well as from any suitable materials such as plastics and/or metals.

Figure 14:
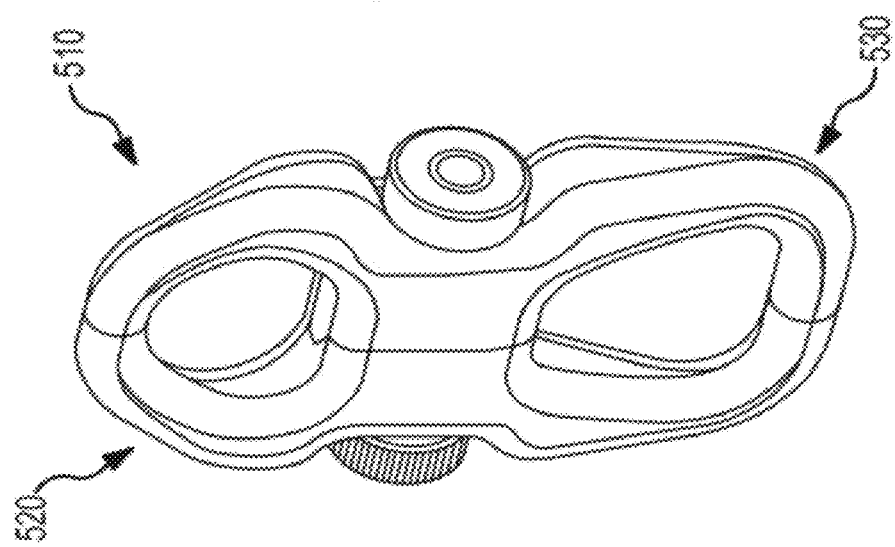
FIG. 14 is a perspective view illustrating the identification tag retainer according to a fourth exemplary embodiment shown in a closed state.

FIGS. 14-17 illustrate a fourth exemplary embodiment of a retainer 510. In the closed position, retainer 510 includes upper loop portion 520 and lower loop portion 530. Loop portions 520 and 530 are formed by mating first and second frames 512 and 514. First frame 512 is comprised of a main body portion 541 with arcuate arms 521 and 531 extending therefrom. Second frame 514 is similarly constructed and includes body portion 543 with arcuate arms 523 and 533 extending therefrom. Fastener 560 extends through body portions 541 and 543 and in this case threadably engages body portion 543. In this embodiment loops 520 and 530 lie in a common plane when the retainer is in a closed state, as is shown in FIG. 14. It should be understood, however, that the loops maybe oriented at any suitable angle relative to each other.

Fastener 560 includes head 562 and shaft 564. At least a portion of the length of shaft 564 is threaded to mate with threads 544 formed in body portion 543. Head 562 includes a slot 566 to allow engagement of a tool in order to tighten the fastener. Head 562 also may include knurling such as 568 shown in FIG. 16 to facilitate hand tightening. It should be understood that boss 545, as shown in for example, FIG. 16 is in this case integrally formed with body portion 543. Alternatively, boss 545 could be replaced by a separate fastener element such as a threaded nut.

Referring to FIG. 17 it can be seen that the two frames 512 and 514 include mating structures to facilitate the alignment of the two frames. The main body portions 541 and 543 include mating tongue and groove structures 552 and 554. Each loop portion 520 and 530 includes mating structures as well. For example, loop portion 520 includes pin 522 and socket 524. Similarly, loop portion 530 includes mating pin 532 and socket 534. In this case pins 522 and 532 are tapered to facilitate engagement with sockets 524 and 534 respectively. It should be appreciated that various mating alignment features or guides could be used, for example, tongue and groove features, pins and slots, pins and sockets, notches, various protrusions and mating receptacles, and the like as well as various combinations thereof.

When retainer 510 is in the open state, pins 522 and 532 as well as tongue 552 are disengaged from their mating respective sockets and groove. Once the structures are disengaged frames 512 and 514 may be rotated relative to each other thereby providing additional access to loops 520 and 530. Fastener 560 acts as a pivot about which frames 512 and 514 may pivot.

Once the frames are loosened and rotated relative to each other, such as shown in FIGS. 16 and 17, the retainer's loops 520 and 530 may be accessed for attachment to a D-ring or collar as well as for installing tags. When retainer 510 is in the closed state each mating element is inserted into its respective socket or groove and fastener 560 is tightened in order to maintain the two frames in a close fitted arrangement. When in the closed state the pins and groove also provide a rigid connection between the respective connection points.

As can be appreciated from the figures, arcuate arm portions 521, 523, 531, and 533 may taper from their respective body portions 541 and 540 to a smaller cross-section, which is suitably sized to accept standard tags as described above. One ordinarily skilled in the art will recognize that retainer 510 may be formed from various methods including, as is contemplated in this case, by casting. Retainer 510 may be cast from various metals such as aluminum. Alternatively, retainer 510 could also be molded from various plastic materials.

Also contemplated is a reversible frame that includes both male and female mating features. For example, the reversible frame could include a pin on one arm and a receptacle on the other arm, such that two arms could be mated with the pin and receptacles oriented 180 degrees apart. Furthermore, the body portion could include both tongue and groove features that mate when rotated 180 degrees.

Figure 18:
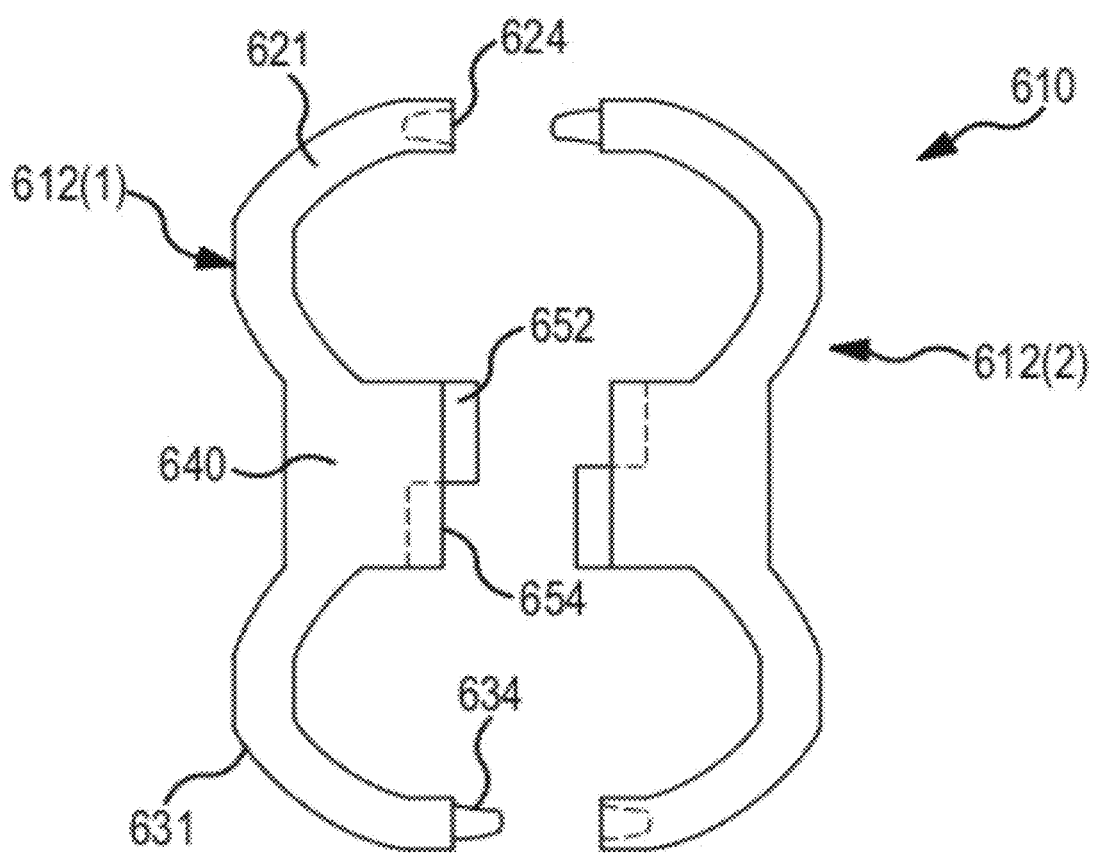
FIG. 18 is a schematic representation of the tag retainer according to a fifth exemplary embodiment.

FIG. 18 schematically illustrates a reversible retainer 610. Retainer 610 includes two identical reversible frames 612. The term identical is used here to refer to the fact that the reversible frames may be manufactured with the same process thereby providing for manufacturing efficiency. For example, frame 612 may be cast or molded using a single mold. The use of the term identical is not intended to preclude changes to the non-reversible aspects of the frame, such as post processing of a casting for example. Frame 612 includes a body portion 640 with arms 621 and 631 extending therefrom. In this case arm 621 includes a receptacle 624 and arm 631 includes pin 634. Thus, when a second frame 612(2) is mated to the first frame 612(1) receptacle 624 of frame 612(1), for example, may receive pin 634 of frame 612(2). Body portion 640 may include both a tongue 652 and groove 654. Accordingly, the tongue and groove of second frame 612(2) mate with the tongue and groove of the first frame 612(1).

Accordingly, the present invention has been described with some degree of particularity directed to the exemplary embodiments. It should be appreciated, though, that the present invention is defined by the following claims construed in light of the prior art so that modifications or changes may be made to the exemplary embodiments without departing from the inventive concepts contained herein.

What is claimed is:

1. A retainer, comprising:
    first and second frames movably coupled to one another and operative to be selectively oriented between an open state and a closed state, said first frame including at least one first arm and said second frame including at least one second arm, said first and second arms cooperative to form a closed loop when said first and second frames are in the closed state;
    wherein said first and second arms extend from respective first and second body portions, said body portions including a tongue and a groove that mate with each other when said frames are in the closed state;
    a fastener for selectively permitting movement of said frames between the open and closed states; and
    wherein said first arm includes a pin sized and configured to mate with a receptacle formed in said second arm, wherein said pin extends from said arm in a direction parallel with said fastener.

2. A retainer according to claim 1, wherein said first frame includes a pair of first arms and said second frame includes a pair of second arms, said first and second arms cooperative to form a pair of closed loops when in the closed state.

3. A retainer according to claim 2, wherein at least one of said first and second frames is rotatable about said fastener.

4. A retainer according to claim 3, wherein said fastener threadably engages one of said first and second frames.

5. A retainer according to claim 3, wherein at least one of said first and second frames is axially movable along said fastener in the open state.

6. A retainer according to claim 2, wherein said first and second arms extend from respective first and second body portions.

7. A retainer according to claim 6, wherein said fastener extends through said body portions.

8. A retainer, comprising:
    first and second frames movably coupled to one another and operative to be selectively oriented between an open state and a closed state, said first frame including a pair of first arms extending from a first body portion, and said second frame including a pair of second arms extending from a second body portion, said first and second arms cooperative to form a pair of closed loops when said first and second frames are oriented in the closed state, and wherein said first and second arms lie in a common plane;
    a fastener extending through one of said first and second body portions and engaging another of said body portions for selectively permitting movement of said frames between the open and closed states, wherein at least one of said first and second frames is rotatable about said fastener in either direction from the closed state; and wherein at least one of said first arms includes a pin extending parallel with said fastener, said pin sized and configured to mate with a receptacle formed in at least one of said second arms.

9. A retainer according to claim 8, wherein said frames include at least one alignment guide.

10. A retainer according to claim 9 wherein said frames include a tongue and a groove that mate with each other when said frames are in the closed state.

11. A retainer according to claim 8, wherein each said arm extends arcuately and tapers from its respective body portion.

12. A retainer according to claim 8, wherein at least one of said first and second frames is axially movable along said fastener when in the open state.

13. A retainer, comprising:

first and second frames movably coupled to one another and operative to be selectively oriented between an open state and a closed state, said first frame including a pair of first arms and said second frame including a pair of second arms, said first and second arms cooperative to form a pair of closed loops when said first and second frames are in the closed state;

wherein said first and second arms extend from respective first and second body portions, said body portions including a tongue and a groove that mate with each other when said frames are in the closed state; and a fastener for selectively permitting movement of said frames between the open and closed states, wherein at least one of said first and second frames is rotatable about said fastener in either direction from the closed state.

14. A retainer according to claim 13, wherein at least one said first arm includes a pin sized and configured to mate with a receptacle formed in at least one said second arm.

15. A retainer, comprising:

first and second frames movably coupled to one another and operative to be selectively oriented between an open state and a closed state, said first frame including a pair of first arms extending from a first body portion, and said second frame including a pair of second arms extending from a second body portion, said first and second arms cooperative to form a pair of closed loops when said first and second frames are oriented in the closed state, said frames including a tongue and a groove that mate with each other when said frames are in the closed state, and wherein said first and second arms lie in a common plane; and a fastener extending through one of said first and second body portions and engaging another of said body portions for selectively permitting movement of said frames between the open and closed states, wherein at least one of said first arms includes a pin extending parallel with said fastener, said pin sized and configured to mate with a receptacle formed in at least one of said second arms.

* * * * *